United States Patent
Jones et al.

(10) Patent No.: US 6,169,134 B1
(45) Date of Patent: Jan. 2, 2001

(54) VISCOSIFYING HYDROCARBON LIQUIDS

(75) Inventors: Cruise K. Jones, Houston; David B. Acker, The Woodlands, both of TX (US)

(73) Assignee: Nalco/Exxon Energy Chemicals, L.P., Sugar Land, TX (US)

( * ) Notice: Under 35 U.S.C. 154(b), the term of this patent shall be extended for 0 days.

(21) Appl. No.: 08/989,714

(22) Filed: Dec. 12, 1997

(51) Int. Cl.⁷ .................................................... C08L 5/01
(52) U.S. Cl. ........................ 524/476; 523/130; 507/118; 507/119
(58) Field of Search ........................... 524/476; 523/130; 507/118, 119

(56) References Cited

U.S. PATENT DOCUMENTS

| | | | |
|---|---|---|---|
| 4,147,677 | 4/1979 | Lundberg et al. | 260/23.5 A |
| 4,157,432 | 6/1979 | Lundburg et al. | 526/31 |
| 4,176,073 * | 11/1979 | Ryer et al. | 252/32.7 |
| 4,299,710 * | 11/1981 | Dupre et al. | 252/8.5 A |
| 4,442,011 | 4/1984 | Thaler et al. | 252/8.5 M |
| 4,661,554 | 4/1987 | Coran et al. | 524/504 |
| 4,670,515 | 6/1987 | Olivier | 525/285 |
| 4,857,254 | 8/1989 | Wong | 264/211.24 |
| 4,950,541 | 8/1990 | Taber et al. | 428/373 |
| 5,047,479 | 9/1991 | Ohme et al. | 525/183 |
| 5,066,542 | 11/1991 | Taber et al. | 428/461 |
| 5,157,083 | 10/1992 | Aonuma et al. | 525/285 |
| 5,346,963 | 9/1994 | Hughes et al. | 525/285 |

* cited by examiner

Primary Examiner—Peter D. Mulcahy
(74) Attorney, Agent, or Firm—Walter C. Danison; Thomas M. Breininger

(57) ABSTRACT

An oil based drilling mud is viscosified with a maleated ethylene-propylene elastomers. The elastomers are preferably EPM copolymers or EPDM terpolymers. The concentration of the maleic anhydride grafted to the copolymer or terpolymer backbone ranges from 0.01 to 5 wt %, preferably 0.1 to 2.0 wt %. The maleated elastomers are far more effective oil mud viscosifiers than the organophilic clays presently used.

20 Claims, No Drawings

VISCOSIFYING HYDROCARBON LIQUIDS

BACKGROUND OF THE INVENTION

This invention relates generally to oil-based drilling muds viscosified with ethylene/propylenes elastomers grafted with dicarboxylic acid anhydrides. Specifically, the invention relates to oil-based muds viscosified with maleated EPM copolymers and EPDM terpolymers.

In the field of drilling in the exploration for oil and gas, an important component is that of the formulation of drilling muds. Drilling muds are the fluids which are used to maintain pressure, cool drill bits and lift cuttings from the borehole and vary in composition over a wide spectrum. Generally, drilling muds are based on aqueous formulations or oil-based formulations.

A conventional oil-based drilling mud formulation is comprised of basically the following ingredients: oil (generally refined oil), emulsifying agents, water (e.g. brine), and viscosifying agent. The formulation may also include wetting agents, weighting agents and amine treated clays.

The above formulations perform adequately in a number of applications, primarily those where the use of oil-based drilling muds is dictated by the lack of stability of the formation in which drilling is taking place. For example, in various types of shale formation, the use of conventional water-based muds can result in a deterioration and collapse of the shale formation. The use of the oil-based drilling muds circumvents this problem.

Viscosifying agents are used in the drilling mud to impart Theological properties thereto to enhance the mud's ability to carry and suspend particle (drill cuttings and barite). Asbestos has been used as a viscosifying agent but, for obvious health reasons, it is no longer used as an oil based viscosifier. Sulfonated EPDM's (disclosed in U.S. Pat. Nos. 4,157,432 and 4,442,011) have been proposed for use as oil mud viscosifiers, but have not received extensive use because the lack of availability.

Oil mud viscosifiers presently widely used are organophilic clays treated with quaternary amine compounds to impart lipophilic properties thereto. For many wells, particularly deep hot wells, relatively large amounts of the organophilic clays must be used to be effective. Excessive solids in the mud can lead to problems such as high plastic viscosity, and resultant mud circulation problems.

As described below, the oil-based drilling mud of the present invention employs ethylene-propylene elastomers grafted with certain dicarboylic acid anhydride (specifically maleic anhydrides). U.S. Pat. No. 4,670,515 discloses ethylene-propylene rubbers grafted with maleic anhydrides (and other dicarbonylic acid anhydrides) used as low molecular weight oil VI improver and as impact modifier for polar thermoplastic resins. Other maleated polymers are disclosed in U.S. Pat. Nos. 4,661,554; 4,857,254; 4,950,541; 5,047,479; 5,047,479; 5,066,542; 5,151,083; and 5,346,963. None of these references however relate to oil-based drilling muds.

SUMMARY OF THE INVENTION

The oil-based drilling mud of the present invention comprises an oil mud viscsified with ethylene-propylene (EP) elastomers, particularly EPM copolymers and EPDM terpolymers, grafted with certain dicarboxylic acid anhydrides, preferably maleic anhydride.

The preferred grafted polymer, maleated EP elastomer, is prepared by reacting from 0.01 to 5.0 wt % of maleic anhydride with the EP elastomers.

The maleated EP elastomer is added to the oil mud at the desired level to improve key rheological properties (based on API RP-13) of the mud, such as viscosity, yield point, and gel strength.

DESCRIPTION OF THE PREFERRED EMBODIMENTS

For purposes of describing the present invention, the following terms shall have the definitions indicated:

"Ethylene-propylene elastomers" are synthetic polymers comprising ethylene/propylene copolymers (EPM) and ethylene/propylene/diene terpolymers (EPDM).

"EPM" is a copolymer having the following general formula:

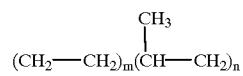

"EPDM" is a terpolymer having the following general formula:

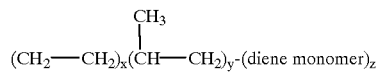

"Oil mud emulsion" comprises a hydrocarbon liquid as the continuous phase and water as the discontinuous or dispersed phase.

The composition of the oil base mud of the present invention comprises mainly (a) an oil phase (b) a dispersed water phase (c) a viscosifying agent (maleated EP elastomer)

These mud ingredients and methods of preparing and using the oil based mud are described below.

Oil and water phases (oil mud emulsion): As indicated above oil mud may comprise any hydrocarbon liquid including diesel oil, fuel oil, crude oil, refined oil and the like. Because of costs, diesel oil is generally the preferred hydrocarbon liquid.

The water dispersed in the oil may be fresh water but preferably is brine. From 1 to 40, generally 2 to 20, wt % of the water is dispersed in the oil by use of emulsifiers such as alkaline soaps of fatty acids.

The oil based muds described above are well known in the art (see for example U.S. Pat. No. 4,525,522).

Viscosifying Agent: The viscosifying agent of the present invention will be described with reference to the preferred maleated EP elastomers. It is to be understood, however, that other dicarboxylic acid anhydrides described generally below may be used instead of the maleated EP elastomers.

The preferred elastomers are EPM copolymers and EPDM terpolymers having the following formulas:

(EPM)

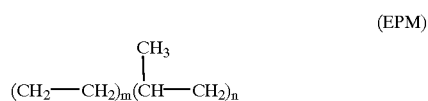

The values of m and n are selected to satisfy (a) the mole ratios of the ethylene and propylene in the copolymer and (b) the molecular weight of the copolymers, both of which are described below.

(EPDM)

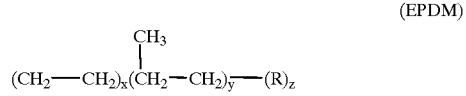

where R is selected from 5 ethyldiene-2-norbornine; 1-4-hexadiene; 5-phenyl-2-norbornene, and dicyclopentadiene. The values of x, y, and z are selected to satisfy (a) the mole ratios of the comonomers and (b) the molecular weight, both of which are described below.

The ethylene content of the EPM copolymer ranges from 20 to 90 mole %, preferably from 30 to 80 mole %, and most preferably 40 to 60 mole %, with a Mooney viscosity of from 7 to 90 (ML (1+4) at 125° C.) and 0 gel. The number average molecular weight ranges from 40,000 to 150,000, preferably 40,000 to 100,000, most preferably 50,000 to 80,000. The copolymer may be amorphous or crystalline.

The preparation of the EPM copolymers are well known in the art, as disclosed in U.S. Pat. No. 4,670,515, the disclosure of which is incorporated herein by reference.

The EPDM elastomers are terpolymers containing from 20 to 90 mole percent (preferably 40 to 90 mole %) of ethylene, from 20 to 70 mole percent of propylene, and from 1 to 20 mole percent of the diene monomer. The dienes include 5-ethylidene-2-norbornene; 1, 4-hexadiene; 5-phenyl- 2- norbornene; and dicyclopentadiene. As stated in the *ENCYCLOPEDIA OF POLYMER SCIENCE AND ENGINEERING*, Vol. 6, pp. 522–523, ethylene-propylene elastomers are made from the basic building blocks of ethylene and propylene and may be combined with a third, or even a fourth, monomer to provide the olefinic sites along the backbone. The term "EPDM elastomers" include terpolymers and tetrapolymers that include at least monomers of ethylene, propylene, and diene.

The preferred EPDM elastomers (ethylene/propylene/5-ethylidene-2-norbornene) have about 0.5 to about 12 wt % 5-ethylidene-2-norbornene monomer, about 30 to 70 wt % ethylene, with the balance of the polymer being propylene. A typical ethylene/propylene/5-ethylidene-2-norbornene terpolymer has an ethylene content of about 50 wt % and a 5-ethylidene-2-norbornene content of about 5 wt %. The terpolymers useful in the present invention have a number average molecular weight ($M_n$), as measured by GPC, of about 40,000 to about 150,000, more preferably of about 40,000 to about 100,000, and most preferably of about 50,000 to about 80,000. All polymer molecular weights quoted herein are number average molecular weights unless otherwise indicated. The Mooney viscosity (ML 1+4, 125° C.) of the terpolymer is about 7 to about 90, more preferably of about 10 to about 80 and most preferably about 20 to about 70. The EPDM should have a low crystallinity ((50%) and preferably less than 30%. The degree of crystallinity and molecular weight ranges are particularly important. Generally, low to zero crystallinity is preferred because of better solubility and better dispersibility, as is low molecular weight EPDM. EPDM terpolymers useful in the present invention are commercially available in a variety of grades from a number of manufacturers, including Exxon Chemical Co., Uniroyal, Dupont, DSM Copolymer, and Polysar to name a few.

Maleic Anhydride and other Dicarboxylic Acid Anhydrides: As indicated above the preferred dicarboxylic acid anhydride is maleic anhydride. Other useable anhydrides have the following formula:

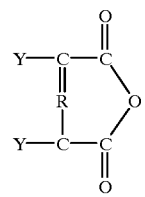

in which R is an alkyl group having from 0–4 carbon atoms and Y is preferably hydrogen but may be an organic group such as a branched or straight chain alkyl group of 1–12 carbon atoms.

Grafting Process: The maleic anhydride is grafted onto the ethylene-propylene elastomer within the range of 0.01 to 5 wt %, preferably within 0.05 to 4 wt % and most preferably 0.1 to 1.5 wt %.

Methods of grafting maleic anhydride onto the backbone of copolymers and terpolymers are well known in the art. The grafting process may be carried as described in the above referenced U.S. Pat. No. 4,670,515 the disclosure of which is incorporated herein by reference.

Another grafting method is a free radical process described in U.S. Pat. No. 4,661,554. This process employs a free radical generator (organic peroxides such as dicumylperoxide or benzothiazyl disulfide, the later being preferred). The EP elastomer, maleic anhydride and free radical generator are charged to a mixer such as a twin extruder and subjected to elevated temperatures (typically 100° C.–200° C.). The reaction may produce some cross linking which, for purposes of the present invention, can be tolerated. Generally an amount of the maleic anhydride in excess of that to be grafted onto the polymer backbone is used to ensure sufficient grafting.

Maleated ethylene-propylene elastomers are available from a number of commercial sources: Maleated EP copolymer marketed as Exxelor 1801 and 1803 by Exxon Chemical Co., Maleated EPDM terpolymer marketed as Royaltuf 465 and 490 by Uniroyal, and maleated EPDM terpolymer marketed as EPDM MDE 9411 by Exxon Chemical Co.

The commercially available maleated elastomers are generally in the form of pellets. To facilitate their use in drilling muds, the pellets are reduced in size to fine particles of about 8 to 30 mesh (USS sieve series).

OPERATIONS

The drilling mud of the present invention may be formulated at the well site but is preferably formulated at the plant in large containers.

The water is first emulsified in the oil (stabilized) using a water/oil emulsifier under agitation. The additives then are sequentially added to the oil mud under agitation. The viscosifier may first be added to ensure suspension of the other additives. Additives other than those mentioned above may be added under agitation. With the oil based mud formulated, it is hauled to the drilling site and transferred to the mud handling facilities.

An example mud of the present invention may have the following formulation:

|  | Broad Range | Preferred Range |
|---|---|---|
| oil (refined oil) | 60–100 wt % | 70–80 wt % |
| water (brine 10 lb/gal CaCl$_2$) | 0–40 wt % | 2–20 wt % |
| emulsifier (fatty acid soap) | 2–20 lb/bbl | 4–10 lb/bbl |
| viscosifier (EP elastomer grafted with 0.01 to 5.0 wt % maleic anhydride) | 0.05–4 wt % | 0.1–2 wt % |
| barite | 0–1000 lb/bbl | 5–600 lb/bbl |

Other optional additives include other viscosifiers, such as organophilic clays, wetting agents, lime, secondary emulsifiers, and fluid loss control additive.

With the oil mud prepared and delivered to the drilling site, the mud is continuously circulated down the drill pipe and returned to the surface in the annulus. Bit cuttings generated by the rotating drill bit are carried to the surface where the fluid is processed through a shale shaker and other solids separation apparatus.

EXAMPLES

Experiments were carried to determine the effect of maleated EP elastomer on the several key rheological properties of oil based drilling muds.

Test procedures were in accordance with API RP 13 which determine the following rheological properties of the mud:

viscosity (cp)

plastic viscosity yield point gel strength

Base mud samples without maleated EP elastomers were prepared. Table I presents the compositions of the various base mud samples.

TABLE I

| Sample No. | Oil[1] (ml) | Emulsifier[2] (ml) | Brine[3] (ml) | Lime (gr) | Barite (gr) | Ca[4] Bent. (gr) | Prim.[5] Visc. (gr) |
|---|---|---|---|---|---|---|---|
| 1. | 223 | 10 | 56 | 5 | 220 | 30 | 2 |
| 2. | 223 | 10 | 56 | 5 | 220 | 30 | 2 |
| 3. | 223 | 10 | 56 | 5 | 220 | 30 | 2 |
| 4. | 223 | 10 | 56 | 5 | 220 | 30 | 2 |
| 5.[a] | 223 | 10 | 56 | 5 | 220 | 30 | 2 |
| 6. | 223 | 10 | 56 | 5 | 220 | 30 | 2 |

TABLE I-continued

| Sample No. | Oil[1] (ml) | Emulsifier[2] (ml) | Brine[3] (ml) | Lime (gr) | Barite (gr) | Ca[4] Bent. (gr) | Prim.[5] Visc. (gr) |
|---|---|---|---|---|---|---|---|
| 7. | 223 | 10 | 56 | 5 |  | 160 | 2 |
| 8.[c] | 196 | 10 | 49 | 5 | 440 | 30 | 2 |
| 9.[b] | 223 | 10 | 56 | 5 | 220 | 30 | 2 |
| 10. | 223 | 10 | 56 | 5 | 220 | 30 | 2 |

[1] Escaid 110 is a parafinic oil marketed by Exxon Chemical Co.
[2] Xtra-EP marketed by IBEX
[3] 342 gr water, 41 gr CaCl$_2$
[4] used to simulate bit cuttings
[5] Geltone marketed by Baroid
[a] polyalphaolefin (marketed by Shell Oil Co.) used instead of Escaid 110
[b] diesel used instead of Escaid 110
[c] 2 mls of secondary emulsifier (Xtra ESW) used The maleated EPDM or EPM was blended into base oil mud samples and the formulated mud samples were aged in a roller for 16 hours at the temperature on Table II. Where two aging temperatures are indicated on Table II, the mud was first aged at the lower temperature for 16 hours and tested followed by aging at the higher temperature for an additional 16 hours.

The maleated EPDM used in samples Royaltuf 465™, Royaltuf 490™, and MDE 9411™.

Royaltuf 465 and 490 are available from Uniroyal and MDE 9411 is available from Exxon Chemical Co.

These terpolymers have an ethylene content ranging from 40 to 60 wt % with Mooney viscosity ranging from 7 to 90 (ML(1+4) at 125° C.) and contain 0 gel. The amount of maleic anhydride grafted onto the terpolymer was less than about 2 wt %.

The maleated EPM copolymers tested were Exxelor VA 1801 and Exxelor 1803, marketed by Exxon Chemical Co. These copolymers have an ethylene range between about 40 to 60 wt %, with a Mooney viscosity range of 7 to 90 (ML (1+4) at 125° C.) with 0 gel. The maleic anhydride grafted onto the copolymer was less than about 2 wt %.

These polymers are available in pellet form and were ground to a mesh size of about 10 to 20 mesh (U.S. Sieve Series).

The rheological properties of the samples tested were as shown in Table II. (The temperature shown beside each Sample No. (e.g. 1(400° F.) is the aging temperature of the formulated mud.)

TABLE II

| Mud Sample (T ° F.) Royaltuf 465 | 1 (400° F.) 0 | 1 (400° F.) 0.5 lb/bbl | 1(400° F.) 1.0 lb/bbl | 2 (150° F.) 0 | 2 (150° F.) 1.0 lb/bbl | 2 (350° F.) 1.0 lb/bbl | 3 (400° F.) 0 | 3 (400° F.) 1 lb/bbl |
|---|---|---|---|---|---|---|---|---|
| RPM |  |  |  |  |  |  |  |  |
| 600 | 47 | 57 | 87 | 71 | 110 | 129 | 57 | 87 |
| 300 | 22 | 29 | 45 | 42 | 67 | 71 | 28 | 45 |
| 200 | 13 | 19 | 32 | 31 | 52 | 50 | 19 | 32 |
| 100 | 7 | 11 | 17 | 21 | 35 | 28 | 10 | 17 |
| 6 | 2 | 2 | 2 | 11 | 18 | 3 | 1 | 2 |
| 2 | 1 | 1 | 1 | 10 | 16 | 2 | 1 | 1 |
| Plastic Visc. | 25 | 28 | 42 | 29 | 43 | 58 | 29 | 42 |
| Yield Point | −3 | 1 | 3 | 13 | 24 | 13 | −1 | 3 |
| Gel Strength | 1/1 | 1/2 | 1/3 | 13/39 | 24/49 | 1/3 | 1/1 | 1/2 |
| Mud Sample (T ° F.) Royaltuf 465 | 4 (150° F.) 0 | 4 (150° F.) 1.5 lb/bbl | 4 (400° F.) 0 | 4 (400° F.) 1.5 lb/bbl | 4* (200° F.) 0.9 lb/bbl | 5 (150° F.) 0 | 5 (150° F.) 1.75 lb/bbl | 5 (300° F.) 0 |

TABLE II-continued

| RPM | | | | | | | | |
|---|---|---|---|---|---|---|---|---|
| 600 | 46 | 167 | 51 | 118 | 112 | 67 | 190 | 64 |
| 300 | 25 | 103 | 25 | 62 | 63 | 39 | 125 | 33 |
| 200 | 17 | 78 | 17 | 43 | 45 | 29 | 98 | 23 |
| 100 | 9 | 50 | 9 | 23 | 26 | 18 | 66 | 12 |
| 6 | 2 | 13 | 2 | 2 | 4 | 4 | 22 | 1 |
| 2 | 1 | 10 | 1 | 1 | 3 | 3 | 20 | 1 |
| Plastic Visc. | 25 | 64 | 26 | 56 | 49 | 28 | 65 | 31 |
| Yield Point | 4 | 39 | −1 | 6 | 14 | 11 | 60 | 2 |
| Gel Strength | 1/5 | 9/30 | 1/1 | 2/3 | 3/6 | 1/7 | 15/66 | 1/1 |

*Royaltuf 490

| | 5 (300° F.) | 6 (150° F.) | 6 (150° F.) | 6 (400° F.) | 6 (400° F.) | 7 (150° F.) | 7 (150° F.) | 7 (150° F.) |
|---|---|---|---|---|---|---|---|---|
| | | | | | Royaltuf 465 | | | |
| | 1.75 lb/bbl | 0 | 1.75 lb/bbl* | 0 | 1.75 lb/bbl* | 0 | 1.5 lb/bbl | 0 |
| | | | | | Royaltuf 490 | | | |
| Mud Sample (T ° F.) | | | | | | 0 | 0 | 1.5 lb/bbl |

| RPM | | | | | | | | |
|---|---|---|---|---|---|---|---|---|
| 600 | 123 | 49 | 235 | 34 | 107 | 54 | 131 | 132 |
| 300 | 66 | 27 | 155 | 16 | 60 | 28 | 73 | 74 |
| 200 | 46 | 18 | 122 | 10 | 43 | 19 | 53 | 52 |
| 100 | 26 | 10 | 83 | 7 | 24 | 11 | 31 | 30 |
| 6 | 3 | 2 | 35 | 1 | 3 | 2 | 4 | 4 |
| 2 | 2 | 1 | 27 | 1 | 2 | 1 | 3 | 3 |
| Plastic Visc. | 57 | 22 | 50 | 18 | 47 | 26 | 58 | 58 |
| Yield Point | 9 | 5 | 75 | −2 | 13 | 2 | 15 | 15 |
| Gel Strength | 2/3 | 1/5 | 28/101 | 1/1 | 2/3 | 1/3 | 3/6 | 3/6 |

*Modified with clay; 90% active

| | 7 (400° F.) | 7 (400° F.) | 7 (400° F.) | 8 (100° F.) | 9 (200° F.) | 10 (200° F.) |
|---|---|---|---|---|---|---|
| | | | | Royaltuf 465 | | |
| | 0 | 1.5 lb/bbl | 0 | | | |
| | | | Royaltuf 490 | | | |
| Mud Sample (T ° F.) | 0 | 0 | 1.51 lb/bbl | 1.08 lb/bbl | 0.95 lb/bbl | 1.35 lb/bbl* |

| RPM | | | | | | |
|---|---|---|---|---|---|---|
| 600 | 38 | 160 | 124 | 258 | 98 | 165 |
| 300 | 20 | 95 | 70 | 154 | 57 | 93 |
| 200 | 13 | 70 | 50 | 114 | 43 | 67 |
| 100 | 7 | 41 | 28 | 64 | 27 | 40 |
| 6 | 2 | 4 | 3 | 6 | 7 | 6 |
| 2 | 1 | 3 | 2 | 4 | 6 | 4 |
| Plastic Visc. | 18 | 65 | 54 | 104 | 41 | 72 |
| Yield Point | 2 | 30 | 16 | 50 | 16 | 21 |
| Gel Strength | 1/1 | 2/6 | 2/3 | 3/5 | 6/17 | 5/12 |

*Duplicate tests at 60 hours aging gave substantially same results

| Mud Sample (T ° F.) | 4 (200° F.) | 4 (400° F.) | 4* (400° F.) | 4* (150° F.) | 4 (300° F.) |
|---|---|---|---|---|---|
| VA 1801 | 1.06 lb/bbl | 1.5 lb/bbl | 1.68 lb/bbl | 0.84 lb/bbl | 0.84 lb/bbl |

| RPM | | | | | |
|---|---|---|---|---|---|
| 600 | 109 | 111 | 133 | 100 | 96 |
| 300 | 68 | 62 | 75 | 55 | 53 |
| 200 | 41 | 45 | 54 | 40 | 37 |
| 100 | 23 | 25 | 31 | 24 | 20 |
| 6 | 4 | 3 | 3 | 6 | 2 |
| 2 | 3 | 2 | 2 | 5 | 1 |
| Plastic Visc. | 41 | 49 | 58 | 45 | 43 |
| Yield Point | 27 | 13 | 17 | 10 | 10 |
| Gel Strength | 3/8 | 2/4 | 3/4 | 9/17 | 1/2 |

| Mud Sample (T ° F.) | 4 (200° F.) | 4 (400° F.) | 4* (400° F.) | 4* (150° F.) | 4 (300° F.) |
|---|---|---|---|---|---|
| MDE 9411 | 1.06 lb/bbl | 1.5 lb/bbl | 1.68 lb/bbl | 0.84 lb/bbl | 0.84 lb/bbl |

| RPM | | | | | |
|---|---|---|---|---|---|
| 600 | 99 | 120 | 139 | 97 | 98 |
| 300 | 52 | 67 | 76 | 54 | 55 |
| 200 | 37 | 48 | 53 | 40 | 40 |

TABLE II-continued

| | | | | | |
|---|---|---|---|---|---|
| 100 | 20 | 27 | 29 | 24 | 22 |
| 6 | 3 | 3 | 2 | 6 | 2 |
| 2 | 2 | 2 | 1 | 5 | 1 |
| Plastic Visc. | 47 | 53 | 63 | 43 | 43 |
| Yield Point | 5 | 14 | 13 | 11 | 12 |
| Get Strength | 2/7 | 2/7 | 2/3 | 9/17 | 2/2 |

*2 ml/bbl each of xtra EP and xtra ESW used instead 10 ml of xtra EP

The tests for VA 1801 were repeated using VA 1803. The test results were substantially identical.

The above tests demonstrate that the maleated EPDM improved the rheological properties of the base mud of concentrations ranging from 0.5 to 1.75 lb/bbl and at temperatures ranging from 100° to 400° F.

Based on other tests carried out, the maleated EP elastomers were found to be significantly more effective in improving Theological properties of oil-based drilling mud than the presently used organophilic clays.

What is claimed is:

1. An oil-based drilling mud comprising
    (a) an oil mud emulsion having
        (i) a continuous liquid hydrocarbon and
        (ii) from 0 to 40 wt % of water dispersed in the liquid hydrocarbon; and
    (b) from 0.05 to 4.0 wt % based on the weight of the emulsion of an ethylene-propylene elastomer grafted with a dicarboxylic acid anhydride having the following formula:

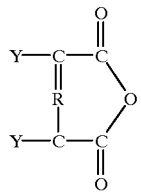

where R is an alkyl group having from 0 to 4 carbon atoms, and
Y is H or alkyl group having from 1 to 12 C atoms.

2. The oil-based drilling mud of claim 1 wherein the amount of dicarboxylic acid anhydride grafted onto the elastomer ranges from 0.01 to 5 wt % based on the weight of the elastomer.

3. The oil based drilling mud of claim 1 wherein Y is H.

4. The oil based mud of claim 1 wherein the concentration of the grafted dicarboxylic acid anhydride in the emulsion ranges from 0.1 to 2.0 wt % and the concentration of the grafted elastomer in the oil mud emulsion is 0.1 to 2.0 wt %.

5. The oil based drilling mud of claim 1 wherein the elastomer is EPDM.

6. The oil based drilling mud of claim 1 wherein the elastomer is EPM.

7. The oil based drilling mud of claim 1 wherein said oil mud emulsion contains from 2 to 20 wt % brine dispersed in the liquid hydrocarbon.

8. The oil based mud of claim 7 wherein the amount of the maleated ethylene-propylene elastomer in the oil mud emulsion is sufficient to impart a viscosity thereto substantially in excess of the viscosity of the oil mud emulsion.

9. The oil based drilling mud of claim 7 wherein the concentration of the maleated ethylene-propylene elastomer in the oil mud emulsion ranges from 0.05 to 4 wt %.

10. The oil based drilling mud of claim 7 wherein the maleated ethylene-propylene elastomer is EPM or EPDM which have from 0.01 to 5.0 wt % of maleic anhydride grafted thereon.

11. The oil based drilling mud of claim 7 wherein the EPM or EPDM has from 0.1 to 2.0 wt % maleic anhydride grafted thereon.

12. The oil based drilling mud of claim 7 wherein the ethylene/propylene elastomer is an ethylene-propylene copolymer (EPM) having an ethylene content of from 20 to 90 mole % of the copolymer.

13. The drilling mud of claim 12 wherein the ethylene/propylene copolymer has the following formula:

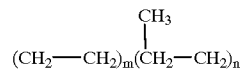

where m and n are selected to provide the copolymer with from 20 to 90 mole % of ethylene and a molecular weight of 40,000 to 150,000.

14. The oil based drilling mud of claim 10 wherein the maleated ethylene-propylene elastomer is ethylene/propylene/diene (EPDM) elastomer.

15. The oil based drilling mud of claim 14 wherein the diene monomer in the EPDM elastomer is selected from the group consisting of 5-ethylidene-2-norbornene, 1,4-hexadiene, 5-phenyl-2-norbornene and dicyclopentadiene.

16. The oil based drilling mud of claim 14 wherein the EPDM elastomer is 5-ethylidene-2-norbornene.

17. The oil based drilling mud of claim 8 wherein the EPDM elastomer has a molecular weight between 40,000 and 150,000.

18. The oil based drilling mud of claim 8 wherein the EPDM elastomer has a crystallinity of less than 50%.

19. The oil based drilling mud of claim 1 and further comprising an effective amount of a weighting agent to impart the desired density to the oil based emulsion.

20. In a rotary drilling method for boring a hole in the earth wherein an oil based drilling mud is circulated down a drill pipe and returned to the surface through the pipe/bore hole annulus, the improvement wherein the oil based drilling mud has the composition of claim 1.

* * * * *